United States Patent Office 3,308,008
Patented Mar. 7, 1967

3,308,008
METALLIC LAMINATE BONDED BY AN ADHESIVE COMPOSITION CONTAINING A POLYVINYL BUTYRAL, A PHENOLIC NOVOLAK AND A POLYMERIC NITROGEN SILANE COMPOUND
Thomas E. Ronay, Oak Park, Ill., assignor, by mesne assignments, to Dow Corning Corporation, Midland, Mich., a corporation of Michigan
No Drawing. Filed May 3, 1963, Ser. No. 277,685
11 Claims. (Cl. 161—207)

This invention is concerned with an adhesive system and, more particularly, to an adhesive system which is especially suitable for adhering metals to a base.

Numerous adhesive systems have been proposed for uniting a variety of laminae or parts to one another. Such systems are usually employed for particular applications and, correspondingly, vary as to components. In view of the increasing higher property requirements for adhesive systems, such as toughness and bond strength, constant research is conducted to improve adhesive systems for particular applications, especially with respect to uniting metals to various bases.

Accordingly, it is one object of this invention to provide an adhesive system affording a permanent adhesion and having improved toughness and increased bond strength.

Another object is to provide an adhesive system of the foregoing type which has a practical shelf-life and can be stored for a reasonable length of time without undergoing reaction of components.

A further object is to provide an adhesive system which is especially suitable for uniting metals to a base and particularly aluminum, stainless steel and copper.

The adhesive system contemplated consists of a composition comprising three basic components, namely a polyvinyl butyral, a phenolic novolak and a polymeric silicon-nitrogen containing composition. These three components may be present in the adhesive composition within various ranges, the amounts of each being principally determined by such factors as the particular metal and base to be united or the shelf-life required for the composition.

Polyvinyl butyral is a polymeric compound containing both hydroxyl and acetal groups, the acetal groups being derived from butyraldehyde. Polyvinyl butyral resins and their formation are well-known and it is not believed necessary to discuss in detail the usual methods employed in making such resins. As is also well-known to the art, polyvinyl butyrals may be formed having a variety of molecular weights and butyral content. Thus, the molecular weights may range from, for example, 25,000 to 250,000 and the polyvinyl butyral content may also vary, exemplary contents by weight extending from ten percent with the remainder comprising predominantly of polyvinyl alcohol up to a polymeric compound wherein there are substantially no hydroxyl groups or wherein the polymer may be considered as consisting of substantially one hundred percent polyvinyl butyral. Due to the present commercial methods of making polyvinyl butyral, such compounds usually contain a small amount of polyvinyl acetate, generally of the order of two to three percent by weight.

For purposes of the present adhesive system, it is contemplated that a polyvinyl butyral may be used having a molecular weight within the foregoing range and having a polyvinyl butyral content of between seventy to ninety percent by weight of the total polymer, with an average of about eighty percent. Typical polyvinyl butyrals which may be employed and properties of such resins are disclosed in the brochure of Shawinigan Resins Corporation entitled, "Butvar-Formvar, Properties and Uses," copyright 1958. Exemplary polyvinyl butyrals are Butvar B–76 and Butvar B–98, the term "Butvar" being a registered trademark of Shawinigan Resins Corporation.

The second major component of the present system, as previously indicated, is a phenolic novolak, which is a permanently-fusible, acid-catalyzed, resinous condensation product of a phenol with an aldehyde, such as formaldehyde. Typical phenols which may be used are those selected from the class consisting of phenol, cresols and xylenols or mixtures thereof. In general, novolak resins vary in molecular weight, but usually comprise molecules or a mixture of molecules having between three to six phenolic nuclei.

Adhesive systems containing polyvinyl butyral and novolaks have been proposed heretofore for particular applications. However, in accordance with the present invention, a third major component is added, thereby obtaining an improved adhesive for metals, particularly with respect to toughness and bond strength.

The third major component is a polymeric silicon-nitrogen containing compound which is derived from the reaction between ammonia or primary amines and a halosilane. Halosilanes are considered to be silicon halides having hydrogen or one or more organic groups and one or more halogen atoms attached directly to silicon. However, silicon tetrahalide may be included within this term. Such halosilanes may be generically defined by the following formula:

$$R_nSiHal_{4-n}$$

wherein R is hydrogen or a monovalent aliphatic or aromatic hydrocarbon group attached to the silicon, for example, alkyl, aryl or substituted alkyl or aryl and similar groups, and $n$ may be an integer from 1 to 2. Processes for making such compounds and the compounds themselves are disclosed in several patents issued to Nicholas D. Cheronis, examples of which are U.S. Patent Nos. 2,579, 417 and 2,579,418.

As indicated in the Cheronis patents, the reaction of a halosilane, having the above generic formula, with an ammonia or primary amine is understood to result in the substitution of an $NH_2$ or NHR amino group for each of the halogen atoms attached to the silicon. The reaction is normally conducted at a temperature below 0° C., in the absence of water in order to avoid hydrolysis and, frequently, in the presence of an inert organic solvent. In many instances, it has been found that, simultaneously or immediately subsequent to the ammonolysis or aminolysis of the halosilanes, additional reactions will occur wherein many of the resultant ammonolysis or aminolysis reaction product undergo polymerization, forming linear or cyclic polymeric compositions or a combination of the two. In many instances, it is difficult, if not impossible, to isolate the monomeric form of the ammonolysis or aminolysis reaction products. Various primary amines may be employed as indicated in the aforementioned Cheronis patents, however, the lower alkyl amines, such as methyl and ethyl amines, are preferred. The polymeric form of the reaction products have a relatively complex structure depending upon the type of halosilane employed. Suggested structures for such compounds are set forth in the abovementioned Cheronis patents.

In some instances, the ammonolysis or aminolysis reaction products of halosilanes are referred to as "aminosilanes" or "silamines" or "silazanes." The term "silamines" will, at times, be used herein in referring to the particular reaction products contemplated.

The halosilanes and their ammonolysis or aminolysis reaction products are also frequently described in terms of their functionality. Functionality is an indication of either the replaceable halogen atoms attached directly to the silicon or the amino groups which have replaced such halogen atoms. Thus, a halosilane having two replaceable halogen atoms attached directly to the silicon would be referred to as being difunctional as would its corresponding ammonolysis or aminolysis reaction products. Likewise, a halosilane having three or four replaceable halogen atoms attached directly to the silicon, as well as its derivative ammonolysis or aminolysis reaction products, would be referred to as being trifunctional or tetrafunctional, respectively. It is possible to have only one replaceable halogen atom attached to the silicon atom, in which event the corresponding ammonolysis or aminolysis reaction product would be monofunctional. The polyfunctional reaction products are those which tend to polymerize upon formation. Numerous hybrid products can be obtained by ammonolyzing or aminolyzing a mixture of halosilanes having different functionality or different organic groups attached to the silicon atom.

Due to the fact that they have been found to provide the best adhesive properties, particularly in connection with the bonding of aluminum and stainless steel to a synthetic laminate base as described more fully hereinafter, the presently preferred silamines are those wherein R, in the foregoing formula, is a monovalent hydrocarbon radical such as methyl, ethyl, phenyl and substituted derivatives thereof, and $n$ is 1 or 2. Particular silamines are those formed by ammonolyzing a mixture of methyltrichlorosilane and dimethyldichlorosilane or phenyltrichlorosilane and diphenyldichlorosilane.

While, as indicated above, the three components of the present system can be varied to meet particular applications, it has been found generally preferable to use an adhesive system comprising by weight between about thirty-five to fifty percent polyvinyl butyral, twenty-five to forty percent novolak and ten to twenty percent silamine.

Any solvent which is substantially compatible with all of the three major components may be used, however, certain solvents will be found to offer advantages over others. One preferable solvent is methylenedichloride, due to the fact that such a solvent has a moderate rate of evaporation as compared to, for example, acetone and, hence, will permit the resin system to cure or set up under more controlled conditions. If a solvent were used which had a very high rate of evaporation, the solvent would have the tendency to be substantially removed from the system before all of the components had an opportunity to fully polymerize or inter-react to produce a homogeneous, integral bond.

In making up the adhesive system, each of the major components, together with any desired modifiers, may be added in any order to the solvent. For most commercial applications, the amount and type of each component should be present to about the extent which will enable the adhesive system to cure within approximately one to three hours at an elevated temperature of between 100°–300° F. without materially affecting the properties obtainable. Further, the components should also be selected so as to have a shelf-life of between six hours to twenty or more hours, thereby enabling the adhesive system to be readily used in most commercial production operations. An adhesive composition, wherein the components are present within the ranges specified hereinabove, will be found to meet most commercial requirements.

In general, when two parts are to be united by means of the present adhesive system, the same may be applied by spraying, brushing, rolling, dipping or the like. Normally, it is contemplated that the thickness of the adhesive film, in a cured state, will range between 0.50 to 2.00 mils. However, the surface area configuration, porosity, etc. may be such as to vary the amount of adhesive required.

For many applications, it has been found preferable to coat one side of a metal foil or laminae with the present composition and then subject the coated metal to a preliminary drying and curing step, such as heating at 225°–260° F. for from two to ten minutes. The coated metal foil or laminae may then be applied to a base and firmly bonded thereto by a further heat treatment and, if required, pressure.

The present system has particular utility as a means for uniting metals, such as aluminum, as well as in many instances stainless steel and copper, to a synthetic laminate base. Synthetic laminates are usually composed of several filler sheets impregnated with a heat and pressure-curable phenolicaldehyde or similar thermosetting resin. Typical filler sheets are those derived from cellulosic fibers, such as paper, duck or canvas or synthetic fibers, for example, rayon, nylon or the like or glass. In making the synthetic laminates, a plurality of resin-impregnated sheets are assembled in an amount which is determined by the ultimate thickness desired and the assembly placed between the platens of a press and subjected to heat and pressure for a given period and at a predetermined temperature. Exemplary laminates and methods of making the same are disclosed in the patents to Hill, 2,439,929 and Madden 2,816,674.

The following are examples of adhesive systems prepared and used to bond a metal laminae to a synthetic base of the above type.

*Example I*

An adhesive was prepared from a composition comprising 94 parts of methylenedichloride, 28 parts of Bakelite phenolformaldehyde novolak CKR 5254 (average molecular weight of about 600), 42 parts of Butvar B–72–A polyvinyl butyral (average molecular weight 225,000) and 31 parts of the ammonolysis product of a mixture of 1 mole of phenyltrichlorosilane and 4 moles of diphenyldichlorosilane. This composition was applied as about a 0.9 mil coating to one side of a sheet of aluminum foil. After coating, the foil was then heated at a temperature of 250° F. for five minutes. The foil containing the dried, partially advanced coating was then superimposed as the top lamina of an assembly of paper filler sheets, each of which was impregnated with the dried, resinous, partially condensed reaction product of formaldehyde with a mixture of phenol and cresols. The assembly was placed between the platens of a laminating press and subjected to a pressure of 1000 p.s.i. at a temperature of 290° F. for a period approximately forty-five minutes.

Following removal from the press, the composite laminate was permitted to cool and then was subjected to a test for bond strength using the peel test specified by NEMA Standard 3/1961, part 10, page 12 (LP 1–10.13 C). The bond strength was found to average about 4.0 p.s.i.

*Example II*

A similar laminate to that of Example I was made and tested using as the adhesive a composition comprising 22.4 parts of Bakelite phenolic novolak CKR 5254, 33.6 parts of Butvar B–72–A polyvinyl butyral, 9.9 parts of the ammonolysis product of a mixture of 1 mole of methyltrichlorosilane and 1 mole of dimethyldichlorosilane and 34 parts of methylenedichloride as the solvent, with the adhesive initially applied as a 1.8 mil thick to the aluminum foil. Bond strength was found to range between 7.5 to 9.0.

In each of the foregoing examples, the silamine was prepared by introducing the mixture of chlorosilanes, in a hexane solution, into a flask containing an excess of liquid ammonia, the temperature of the reaction being maintained at between about −50° to −60° C. until the silamines were ammonolyzed.

By way of comparison, a similar laminate was formed with aluminum foil omitting the silamine and using, as the adhesive, a composition comprising 19.8 parts of the same polyvinyl butyral, 13.2 parts of the same novolak and 67 parts of methylenedichloride as the solvent. Bond strength was found to average about 0.6 p.s.i. which was increased to an average of 3.3 p.s.i. by extended post cure of the laminate for a period of four weeks at a temperature of about 120° C.

Having described the invention and certain exemplary embodiments thereof, the same is only intended to be limited by the scope of the following claims.

I claim:
1. An adhesive composition comprising a mixture of: (1) a polyvinyl resin consisting predominantly of polyvinyl butyral; (2) a permanently fusible, phenolic-aldehyde condensation product; and (3) the reaction product of (a) a member of the class consisting of ammonia or primary amine with (b) a halosilane having the general formula:

$$R_nSiHal_{4-n}$$

wherein R is a monovalent hydrocarbon radical and $n$ is an integer from 1 to 2, whereby each halogen atom of (b) is substituted with an $NH_2$ or NHR amino group and a silamine is thereby obtained.

2. An adhesive composition as described in claim 1 wherein R is selected from the class consisting of alkyl and aryl groups.

3. An adhesive composition as described in claim 2 wherein R is selected from the class consisting of methyl and phenyl groups.

4. An adhesive composition comprising a mixture of: (1) a polyvinyl resin consisting predominantly of polyvinyl butyral; (2) a permanently fusible, phenolic-aldehyde condensation product; and (3) the reaction product of (a) a member of the class consisting of ammonia or primary amine with (b) a mixture of halosilanes having the formulae:

$$RSiHal_3$$

and $$R_2SiHal_2$$

wherein R is selected from the class consisting of alkyl and aryl groups whereby each halogen atom of (b) is substituted with an $NH_2$ or NHR amino group and a silamine is thereby obtained.

5. An adhesive composition as described in claim 4 wherein R is selected from the class consisting of methyl and phenyl groups.

6. An adhesive composition comprising a mixture of: (1) a polyvinyl resin consisting predominantly of polyvinyl butyral; (2) a permanently fusible, phenolic-aldehyde condensation product; and (3) the reaction product of (a) ammonia with a mixture of (b) diphenyldichlorosilane and phenyltrichlorosilane whereby each halogen atom of (b) is substituted with an $NH_2$ or NHR amino group and a silamine is thereby obtained.

7. An adhesive composition comprising a mixture of: (1) a polyvinyl resin consisting predominantly of polyvinyl butyral; (2) a permanently fusible, phenolic-aldehyde condensation product; and (3) the reaction product of (a) ammonia with a mixture of (b) methyltrichlorosilane and dimethyldichlorosilane whereby each halogen atom of (b) is substituted with an $NH_2$ or NHR amino group and a silamine is thereby obtained.

8. An article of manufacture comprising a metallic laminae bonded to a base with a heat-cured adhesive comprising: (1) a polyvinyl resin consisting predominantly of polyvinyl butyral; (2) a permanently fusible, phenolic-aldehyde condensation product; and (3) the reaction product of a member of the class consisting of (a) ammonia or primary amine witth (b) a halosilane having the general formula:

$$R_nSiHal_{4-n}$$

wherein R is a monovalent hydrocarbon radical and $n$ is an integer from 1 to 2 whereby each halogen atom of (b) is substituted with an $NH_2$ or NHR amino group and a silamine is thereby obtained.

9. An article of manufacture comprising an aluminum lamina bonded to a base with a heat-cured adhesive composition comprising: (1) a polyvinyl resin consisting predominantly of polyvinylbutyral; (2) a permanently fusible, phenolic-aldehyde condensation product; and (3) the reaction product of (a) ammonia with (b) a mixture of diphenyldichlorosilane and phenyltrichlorosilane whereby each halogen atom of (b) is substituted with an $NH_2$ or NHR amino group and a silamine is thereby obtained.

10. An article of manufacture comprising an aluminum lamina bonded to a base with a heat-cured adhesive composition comprising: (1) a polyvinyl resin consisting predominantly of polyvinyl butyral; (2) a permanently fusible, phenolic-aldehyde condensation product; and (3) the reaction product of (a) ammonia with (b) a mixture of methyltrichlorosilane and dimethyldichlorosilane whereby each halogen atom of (b) is substituted with an $NH_2$ or NHR amino group and a silamine is thereby obtained.

11. A metallic foil provided with a partially cured adhesive composition on at least one side thereof comprising: (1) a polyvinyl resin consisting predominantly of polyvinyl butyral; (2) a permanently fusible, phenolic-aldehyde condensation product; and (3) the reaction product of (a) a member of the class consisting of ammonia or primary amine with (b) a halosilane having the general formula:

$$R_nSiHal_{4-n}$$

wherein R is a monovalent hydrocarbon radical and $n$ is an integer from 1 to 2 whereby each halogen atom of (b) is substituted with an $NH_2$ or NHR amino group and a silamine is thereby obtained.

References Cited by the Examiner

UNITED STATES PATENTS

| | | | |
|---|---|---|---|
| 2,721,854 | 10/1955 | Kahl | 260—827 |
| 3,066,060 | 11/1962 | Gross | 260—826 |
| 3,234,159 | 2/1966 | Cooper | 260—826 |

ALEXANDER WYMAN, *Primary Examiner.*

R. J. ROCHE, *Assistant Examiner.*